United States Patent [19]

Yoshimura et al.

[11] Patent Number: 5,012,352

[45] Date of Patent: Apr. 30, 1991

[54] DIGITAL SIGNAL RECORDING APPARATUS TIME-DIVISION MULTIPLEXING VIDEO AND AUDIO SIGNALS

[75] Inventors: Katsuji Yoshimura, Hamamatsu; Kenichi Nagasawa, Kawasaki; Motokazu Kashida, Musashino; Akihiro Shikakura, Yokohama, all of Japan

[73] Assignee: Canon Kabushiki Kaisha, Tokyo, Japan

[21] Appl. No.: 228,594

[22] Filed: Aug. 5, 1988

[30] Foreign Application Priority Data

Aug. 10, 1987 [JP] Japan .................................. 62-199533
Aug. 10, 1987 [JP] Japan .................................. 62-199534
Aug. 21, 1987 [JP] Japan .................................. 62-208613
Dec. 18, 1987 [JP] Japan .................................. 62-320537

[51] Int. Cl.$^5$ ............................................. H04N 5/82
[52] U.S. Cl. ..................................... 358/343; 360/19.1
[58] Field of Search .................... 360/32, 19.1, 38.1; 358/335, 343

[56] References Cited

U.S. PATENT DOCUMENTS

| | | | |
|---|---|---|---|
| 4,303,950 | 12/1981 | Taniguchi et al. | 360/19.1 |
| 4,468,710 | 8/1984 | Hashimoto et al. | 360/19.1 |
| 4,499,503 | 2/1985 | Suzuki . | |
| 4,544,950 | 10/1985 | Tu . | |
| 4,602,295 | 7/1986 | Moriyama et al. . | |
| 4,660,103 | 4/1987 | Wilkinson et al. | 360/19.1 |
| 4,672,467 | 6/1987 | Heitmann | 360/19.1 |
| 4,703,369 | 10/1987 | Moriyama et al. | 358/343 |
| 4,751,590 | 6/1988 | Wilkinson | 360/19.1 |
| 4,769,722 | 9/1988 | Itoh et al. | 360/19.1 |
| 4,819,088 | 4/1989 | Higurashi | 360/19.1 |
| 4,839,750 | 6/1989 | Kato et al. | 360/32 |

FOREIGN PATENT DOCUMENTS

0093374 11/1983 European Pat. Off. .

OTHER PUBLICATIONS

"A Digital TV-System for Satellite Transmission", J. Wasser, W. Zschunke; Nachrichtentechnische Zeits. ntz., vol. 30, No. 5, 1977, Berlin, pp. 417–420.
"Digitale Übertragung von Fernsehsignalen uber Satelliten" H. Haberle, P.C. Ulrich, W. Zschunke; Elec. Nachrichtenwesen; vol. 49, #3, 1974; pp. 343-348.

*Primary Examiner*—Donald McElheny, Jr.
*Attorney, Agent, or Firm*—Fitzpatrick, Cella, Harper & Scinto

[57] ABSTRACT

A digital signal recording apparatus includes first circuitry for forming digital video data, and second circuitry for forming digital audio data. Third circuitry is provided for forming (a) video synchronizing blocks each of which comprises a predetermined number of digital video data and synchronizing data, and (b) audio synchronizing blocks each of which comprises a predetermined number of digital audio data and synchronizing data. Recording circuitry is provided for recording the video synchronizing blocks and the audio synchronizing blocks in tracks formed on a recording medium, the tracks being generally aligned in the direction of travel in the recording medium. The recording circuitry includes time-division multiplexing circuitry for time-division multiplexing a predetermined number of video synchronizing blocks and a predetermined number of audio synchronizing blocks to produce a data sequence for each of the tracks. The time-division multiplexing circuitry produces different data sequences for neighboring tracks.

4 Claims, 10 Drawing Sheets

FIG. 12A

→ RECORD DIRECTION

| A-1 | V-1-2 | V-1-3 |
|---|---|---|
| V-1-1 | V-2-2 | V-2-3 |
| ⋮ | ⋮ | ⋮ |
| V-12-1 | A-2 | V-13-3 |
| V-13-1 | V-13-2 | V-14-3 |
| ⋮ | ⋮ | ⋮ |
| V-23-1 | V-23-2 | A-3 |
| V-24-1 | V-24-2 | V-24-3 |
| ⋮ | ⋮ | ⋮ |
| V-32-1 | V-32-2 | V-32-3 |

FIG. 12B

→ RECORD DIRECTION

| V-1-1 | V-1-2 | V-1-3 |
|---|---|---|
| ⋮ | ⋮ | ⋮ |
| A-1' | V-6-2 | V-6-3 |
| ⋮ | ⋮ | ⋮ |
| V-16-1 | A-2' | V-17-3 |
| ⋮ | ⋮ | ⋮ |
| V-27-1 | V-27-2 | A-3' |
| ⋮ | ⋮ | ⋮ |
| V-32-1 | V-32-2 | V-32-3 |

DIGITAL SIGNAL RECORDING APPARATUS TIME-DIVISION MULTIPLEXING VIDEO AND AUDIO SIGNALS

BACKGROUND OF THE INVENTION

1. Field of the Invention

The present invention relates to a digital signal recording apparatus, and more particularly to an apparatus for recording digital video signal and digital audio signals.

2. Related Background Art

In the field of such recording apparatus there is known a digital video tape recorder (DVTR) utilizing a magnetic recording-reproducing system as the transmission channel. In the following description such a digital video tape recorder will be taken as an example.

In the conventional digital video tape recorder, a recording area for the digital video signal (video area) and a recording area for the digital audio signal (audio area) are separately formed on the recording track, and these two signals are recorded and reproduced by separate signal processing circuits.

In case of recording audio signal and video signals on a same recording medium, there have generally been conducted separate signal processings for audio and video signals as explained above. For this reason there have been required two series of signal processing circuits, with inevitably increased magnitude of the circuits.

Besides, since the amount of audio data is smaller than that of video data, the audio area is designed smaller. Therefore, if the tape is damaged in the longitudinal or transversal direction, the audio data incur severer loss, thus eventually providing sounds of unacceptable quality.

SUMMARY OF THE INVENTION

An object of the present invention is to eliminate the drawbacks mentioned above.

Another object of the present invention is to provide a digital data recording apparatus capable of processing audio data and video data in a common manner as far as possible.

The above-mentioned objects can be achieved, in an embodiment of the present invention, by an apparatus for recording digital video signal and digital audio signal, in which the number of data in an audio synchronizing block containing audio data and synchronizing data is selected equal to be equal to that of data in a video synchronizing block containing video data and synchronizing data, and these synchronizing blocks are recording in a time division multiplexing system.

Still another object of the present invention is to provide a digital signal recording apparatus capable of suppressing the deterioration of audio signal and video signal resulting from a failure in the transmission channel.

The above-mentioned object can be achieved, in an embodiment of the present invention, by an apparatus in which the audio synchronizing block is dispersed in the video synchronizing block in the transmission.

The foregoing and still other objects of the present invention, and the advantages thereof, will become fully apparent from the following description, which is to be taken in conjunction with the attached drawings.

BRIEF DESCRIPTION OF THE DRAWINGS

FIGS. 12A and 12B are views showing the recording sequence of synchronizing blocks in the recorder shown in FIG. 7;

DETAILED DESCRIPTION OF THE PREFERRED EMBODIMENTS

Figure 1:
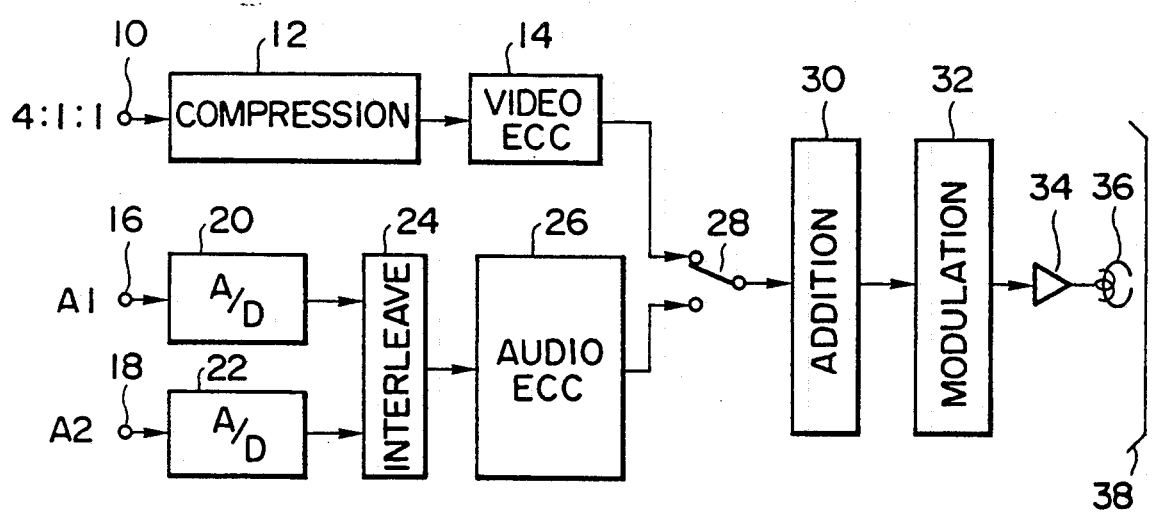
FIG. 1 is a schematic block diagram of a digital video tape recorder embodying the present invention.

Now, the present invention will be clarified in detail by embodiments thereof shown in the attached drawings. FIG. 1 is a schematic block diagram of a digital video tape recorder (DVTR) embodying the present invention.

A video input terminal 10 receives so-called component video signals. A data compression circuit 12 effects subsampling of the luminance signal Y with a rate $2f_{sc}$ ($f_{sc}$ subcarrier frequency) and the color signals I, Q with a rate $\frac{1}{2}f_{sc}$, and sends the sampled data to a video ECC encoding circuit 14 after elimination of the data of an ineffective image area, wherein the effective image ratio is taken as horizontal/vertical=0.844/0.914. Audio signal input terminals 16, 18 receive audio signals of two channels, which are sampled at a rate of 48 KHz and digized in 16 bits respectively in A/D converters 20, 22 and are supplied to an audio interleaving circuit 24. Said circuit 24 rearranges the input data and sends said data to an audio encoding circuit 26.

The encoding operation of the encoding circuits 14, 26 for video and audio signals is conducted in the following manner.

Figure 2A:
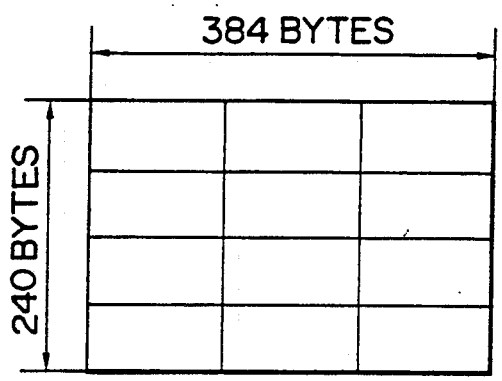
FIGS. 2A to 2D are schematic views showing the data format of a video signal in the recorder shown in FIG. 1.
Figure 2B:
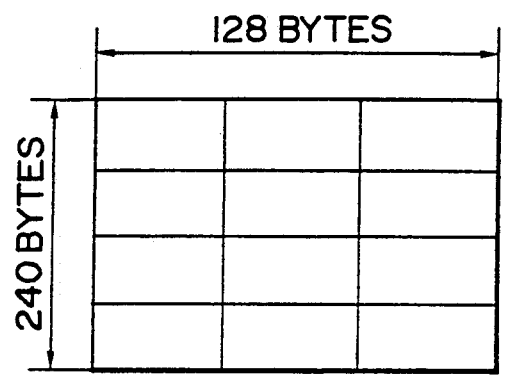
Figure 2C:
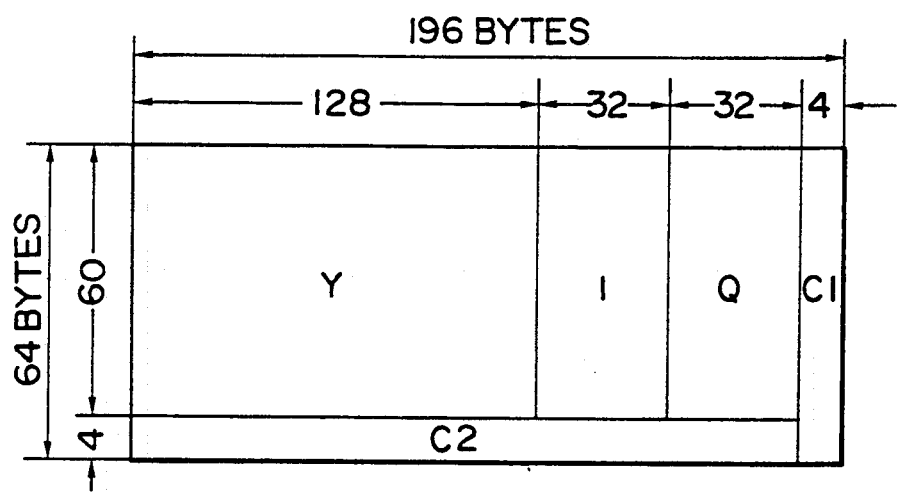

The video luminance signal Y after data reduction can be considered to constitute, as shown in FIG. 2A, a two-dimensional arrangement of 240 bytes in the vertical direction and 384 bytes in the horizontal direction (i.e. 240 rows and 384 columns) per field, and the color signal I or Q can be considered to constitute, as shown in FIG. 2B, a two-dimensional arrangement of 240 bytes in the vertical direction and 128 bytes in the horizontal direction (i.e. 240 rows and 128 columns) per field. Each data arrangement of said signal Y, I or Q is further divided into 12 portions as illustrated. The video encoding circuit 14 mixes a division of the signals Y, I and Q to obtain a data matrix of 60 bytes in the vertical direction and 192 bytes in the horizontal direction (60 rows, 192 columns), and at first effects C2 encoding in the vertical direction and adds C2 parity data of 4 bytes, whereby a two-dimensional data matrix of 64 bytes in the vertical direction and 192 bytes in the horizontal direction, containing C2 parity data, is obtained. Then it effects C1 encoding in the horizontal direction on said data matrix and adds C1 parity data of 4 bytes, whereby a two-dimensional data matrix of 64 bytes in the vertical direction and 196 bytes in the horizontal direction, including C1 and C2 parity data, is obtained. These data are supplied in succession, from the uppermost row, to a switch 28.

For said C1 and C2 codes there may be employed already known codes such as the Reed Solomon code.

Figure 3A:
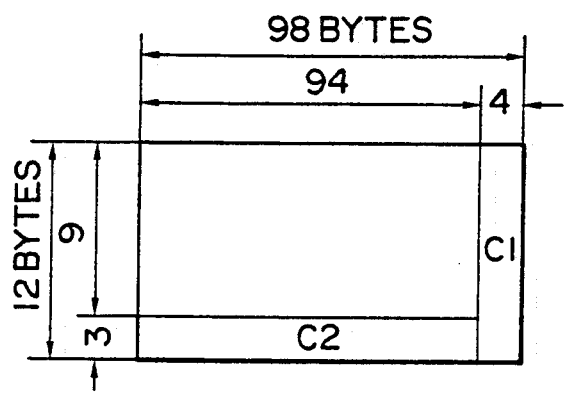
FIGS. 3A and 3B are schematic views showing the data format of an audio signal in the recorder shown in FIG. 1.

The audio signal, subjected to inter-leaving in the audio interleaving circuit 24, is composed of 8008 samples per 5 fields of the video signal. This is due to a fact that a field of the video signal does not exactly correspond to 1/60 seconds. However, since the processing of a leap field is not the object of the present invention, it is assumed, in the following description, that the audio signal consists of 1602 samples per field. Since the audio signal is digitized with 16 bits, 1602 samples correspond to the information of 3204 bytes. Said audio signal of 3204 bytes/field is considered to be composed, as shown in FIG. 3A, of 4 data matrixes each composed of 9 rows in the vertical direction and 94 bytes in the horizontal direction. Said 4 matrixes can hold 3384 bytes ($=9\times 94\times 4$), but the audio signal has only 3204 bytes per field. Thus other data of 180 bytes are inserted per field to make up data of 3384 bytes per field.

The audio encoding circuit 26 effects a C2 encoding operation in the vertical direction on the data matrix of 9 rows and 94 columns shown in FIG. 3A and adds C2 parity data of 3 bytes, thereby forming a data matrix of 12 rows and 94 columns including C2 parity bits. Then it effects C1 encoding on said data matrix and adds C1 parity data of 4 bytes, thereby obtaining a data matrix of 12 rows and 98 columns containing C1, C2 parity data. Said C1 and C2 encodings can be achieved with Reed Solomon codes or the like, as in the video signal. Said data of 12 rows and 98 columns are released in succession, from the uppermost row, to a switch 28.

Figure 2D:
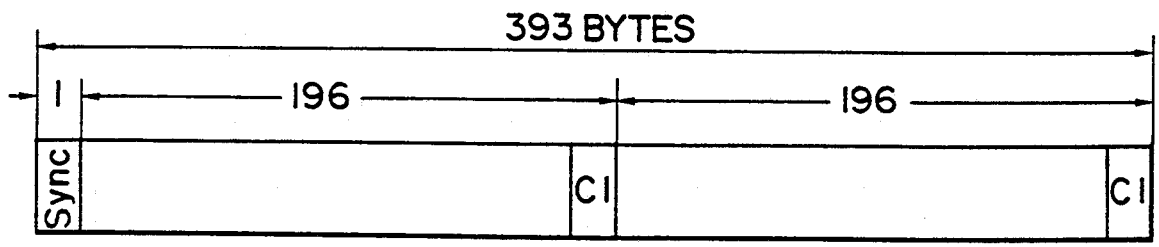
Figure 3B:
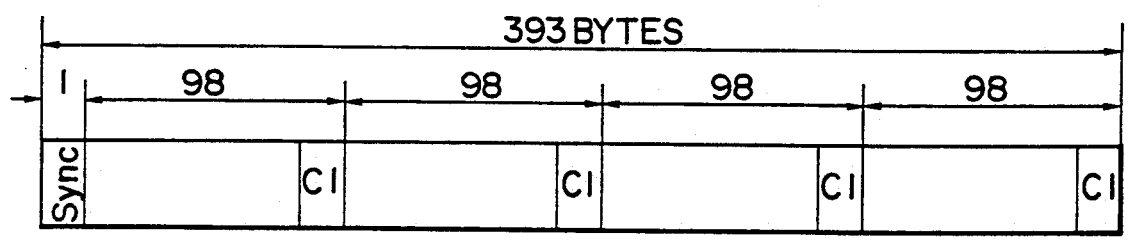

The switch 28 switches the video and audio signals on time division basis. The output of the switch 28 is supplied to a synchronization adding circuit 30, where a synchronizing pattern is added. With respect to the video signal, a synchronizing pattern of 1 byte is added to every two rows of the data matrix of 64 rows and 196 columns, as shown in FIG. 2D. The data of the thus-obtained 393 bytes will be hereinafter called a synchronization block. With respect to the audio signal, a synchronizing pattern of 1 byte is added to every four rows of the data matrix of 12 rows and 98 columns, as shown in FIG. 3B. Thus a synchronization block for audio signal is also composed of 393 bytes.

A modulation circuit 32 modulates the output of the synchronization adding circuit 30 to a signal form with a reduced DC component, suitable for digital recording. The output of the modulation circuit 32 is amplified by a recording amplifier 34, and is magnetically recorded on a magnetic tape 38 by means of a magnetic head 36.

Figure 4:
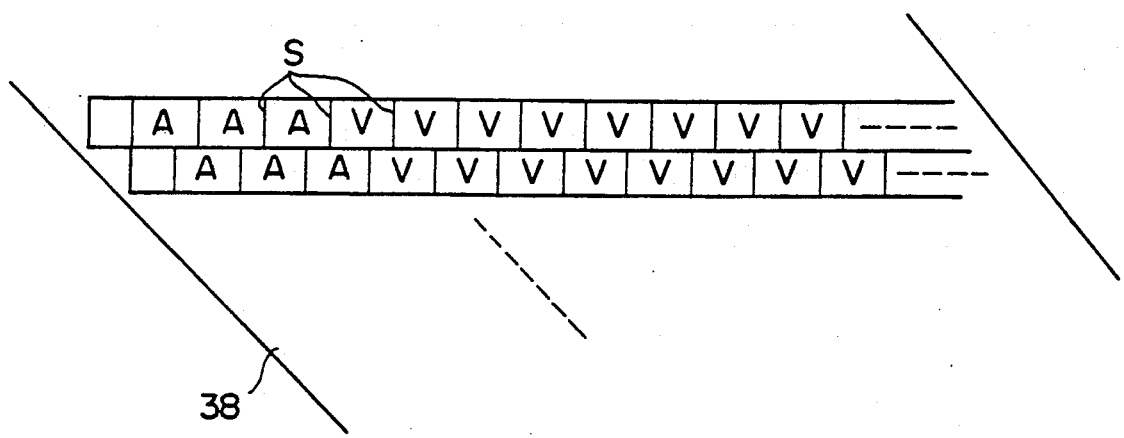
FIG. 4 is a schematic view showing a recording format on a magnetic tape for use in the recorder shown on FIG. 1.

FIG. 4 shows an example of the recording format of the magnetic tape 38, recorded by the recording apparatus shown in FIG. 1. In FIG. 4, S indicates the recording position of the synchronizing information, while A represents the audio signal, and V represent the video signal. Such a recording format allows a significant simplification of the reproducing circuit, since separate window signals need not be formed for the video and audio signals at the detection of the synchronizing signal.

The digital video tape recorder explained above permits the simplification of the circuit structure, since the synchronization adding circuit 30 and ensuing circuits can be commonly used for the audio and video signals, by selecting the number of data of a synchronizing block containing audio data to be equal to the number of data of a synchronizing block containing video data.

In the digital video tape recorder of the foregoing embodiment, data of 180 bytes are inserted to four data matrixes of the audio signal as discussed above, but the insertion of meaningless data of 180 bytes is undesirable.

Figure 5:
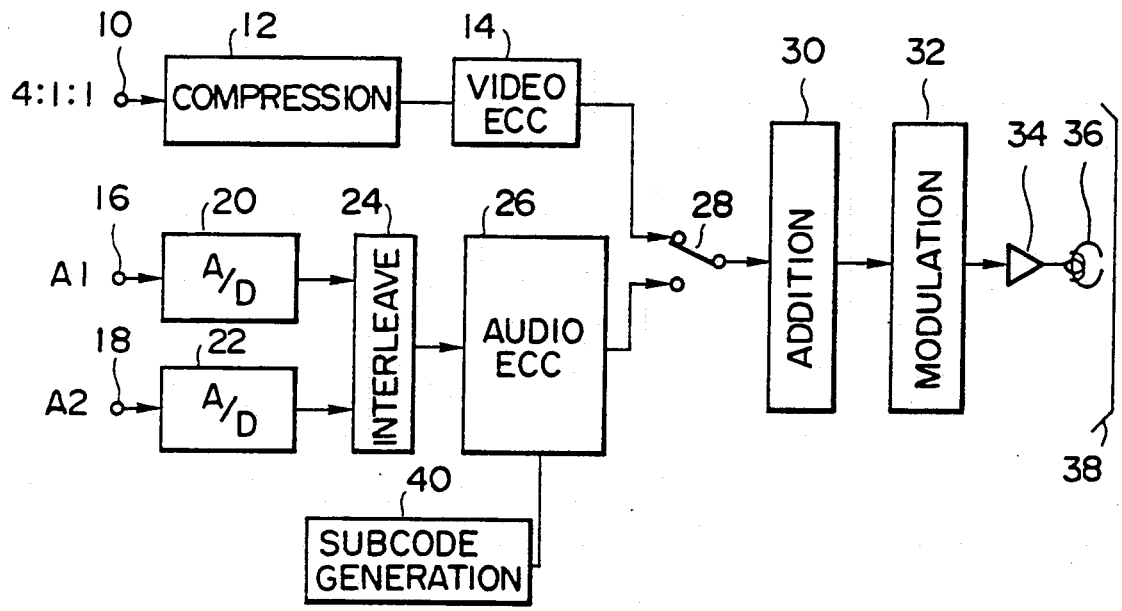
FIG. 5 is a schematic block diagram of a digital video tape recorder constituting another embodiment of the present invention.
Figure 6:
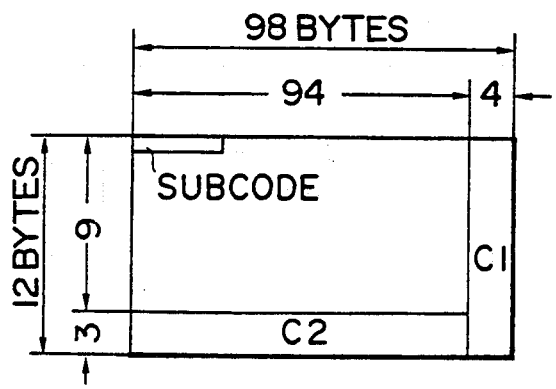
FIG. 6 is a schematic view showing the data format of a video signal in the recorder shown in FIG. 5.

FIG. 5 is a block diagram of a digital video tape recorder improved in this respect, and constituting another embodiment of the present invention, wherein the same components as those in FIG. 1 are represented by the same numbers. In FIG. 5, a sub-code generator 40 generates a cut number for video data, a signal indicating the signal form of the video and audio signals, a time code etc., which are used in the above-mentioned added codes of 180 bytes. The output of the sub-code generator 40 is supplied to the audio encoding circuit 26, and is added, as shown in FIG. 6, to the 1st to 45th columns of the 1st row in the data matrix of 9 rows and 94 columns, which is generated four times in a field. Said added codes are used as control signals or editing signals in the signal reproduction.

Figure 7:
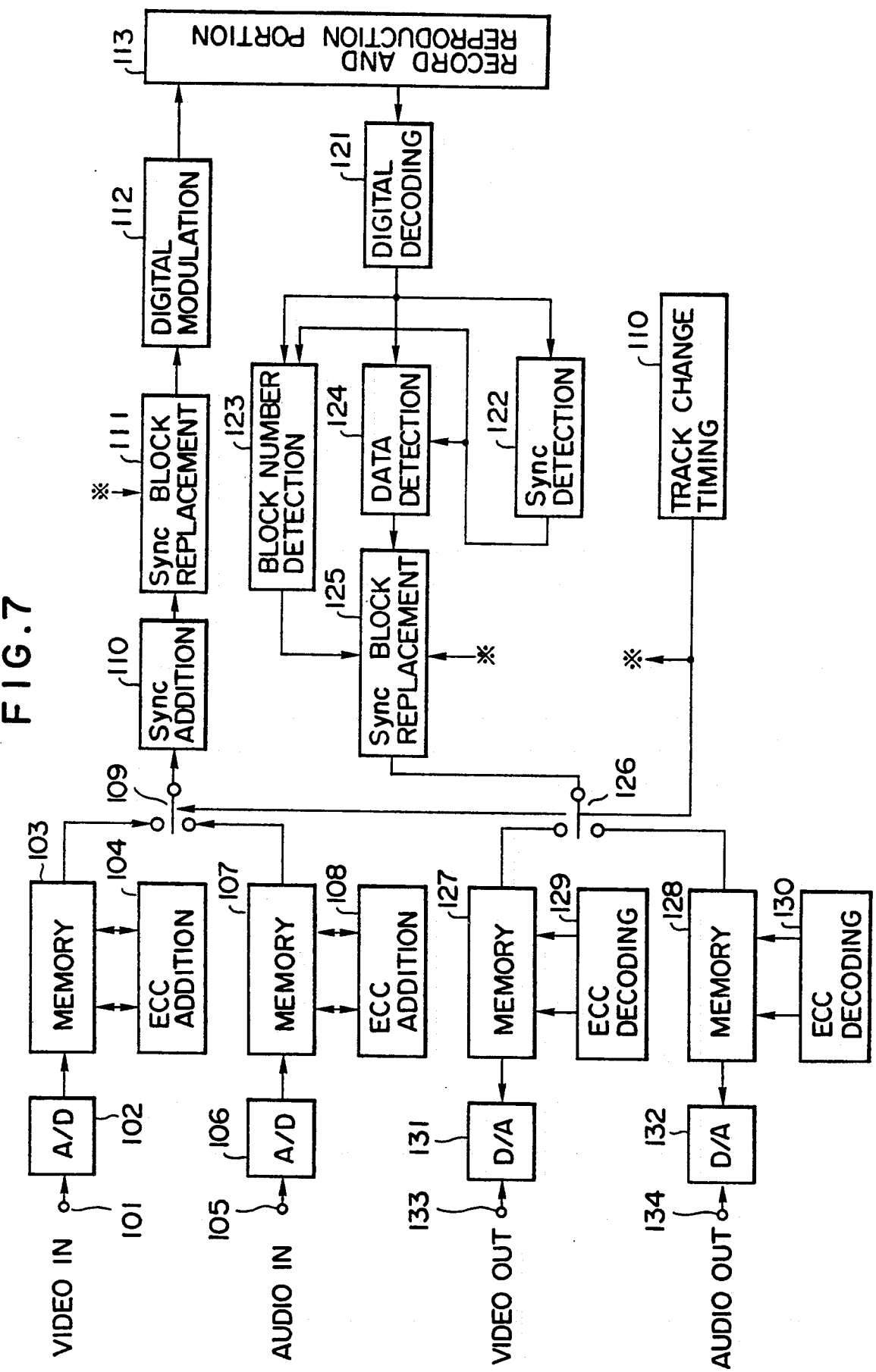
FIG. 7 is a schematic block diagram of a digital video tape recorder constituting still another embodiment of the present invention.

FIG. 7 is a block diagram of a digital video tape recorder constituting still another embodiment of the present invention. A terminal 101 receives luminance signal Y and color difference signals I, Q of a video signal of NTSC type in parallel manner, and said signal Y is sampled with a frequency $4f_{sc}$ ($f_{sc}$ being color subcarrier frequency) while the signals I, Q are sampled with a ¼ sub-carrier frequency. Besides, said sampling is so conducted such that the sampling points are not aligned vertically in neighboring lines of interlace scanning. Thus A/D converter 102 effects so-called sub-sampling.

The signal Y is sampled at $(3.58M/15.75K)\times 4/2=455$ points per a horizontal scanning line (1H). In practice, a horizontal scanning line contains 372 sampling points of data which are obtained only in the effective image frame. For the signal I or Q there are given 96 sampling points, which are about ¼ of those of the signal Y. The output data of the A/D converter 102 are supplied to a memory 103, and error correcting codes (ECC) are added by an ECC addition circuit 104.

Figure 8:
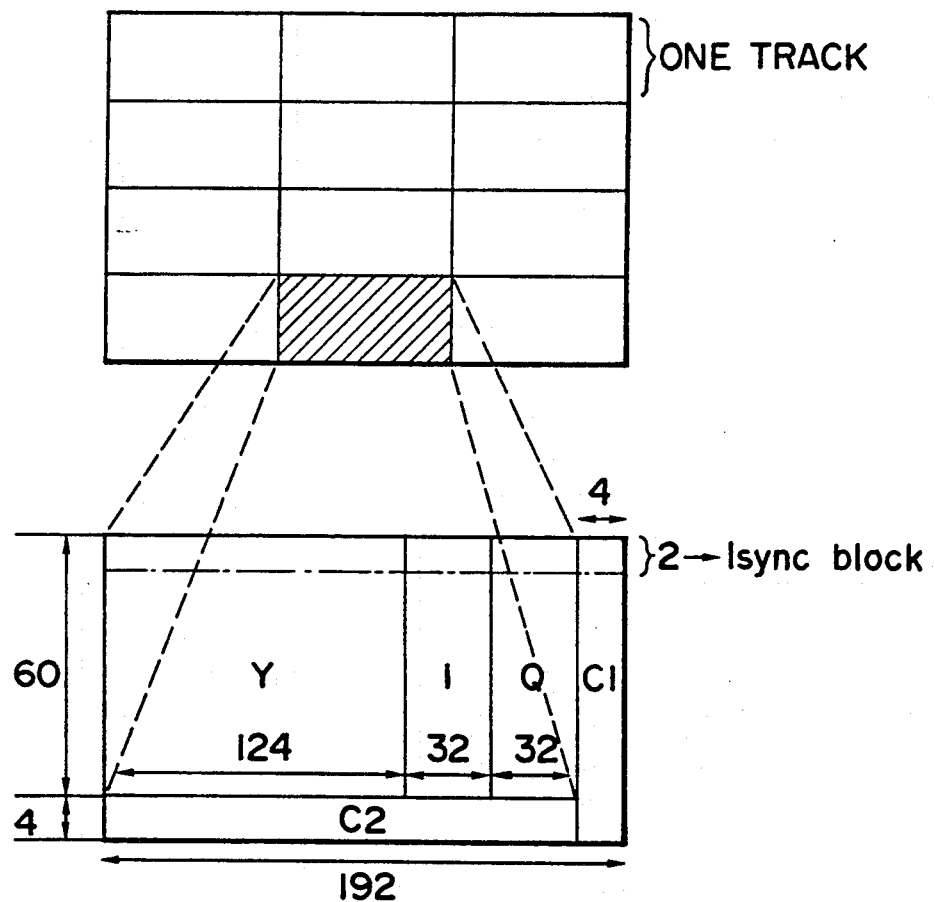
FIG. 8 is a schematic view showing video data to be recorded in the digital video tape recorder shown in FIG. 7.

An error correcting code is added to a block of video data, obtained by dividing a field into four areas in the vertical direction and three areas in the horizontal direction, as indicated by a hatched area in FIG. 8. If a field has 240 effective horizontal scanning lines, said block 2 contains Y-data of the 60 (vertical)×124 (horizontal; 372/3) sampling points, and I, Q-data of the 60 (vertical)×32 (horizontal); (=93/3) sampling points. These data are arranged in the memory 103 as shown in the lower half of FIG. 8, and error correcting codes C1, C2 are added as illustrated to obtain a block 192×64 data. The numbers in FIG. 8 indicate the number of bytes, and the data at each sampling point are composed of 8 bits (1 byte).

Figure 9:
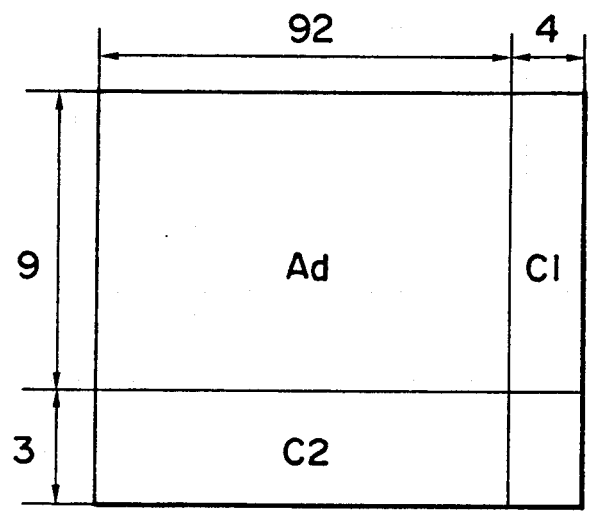
FIG. 9 is a schematic view showing audio data to be recorded in the digital video tape recorder shown in FIG. 7.

A terminal 105 receives audio signal on 4 channels, which are sampled in an A/D converter 106 with a frequency 48 KHz and are supplied to a memory 107. There are obtained 3200 (=48K/60×4) sampling points per a field of the video signal. Said 3200 samples are divided into four audio data blocks, and error correcting codes are added to each block. However, in order to form the audio data and the video data into a synchronizing data block of the same size as will be explained later, other 18 data are added, and 9×92 data are arranged in the memory as shown in FIG. 9. Error correction codes C1, C2 are added as illustrated, by an error correction code addition circuit 108.

In the video tape recorder of the present embodiment, a field is dividedly recorded in four tracks, and each track records three video data blocks and an audio data block. These data are read from the memories 103, 107, in a unit of 384 bytes.

Figure 10:
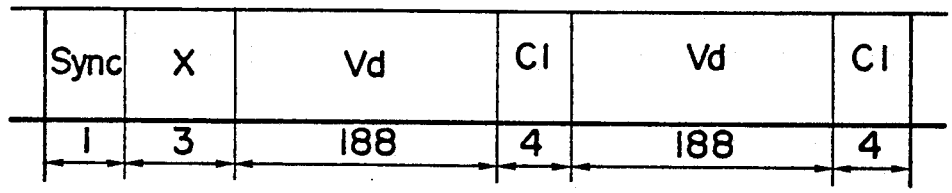
FIG. 10 is a view showing the structure of a video synchronizing block in the recorder shown in FIG. 7.
Figure 11:
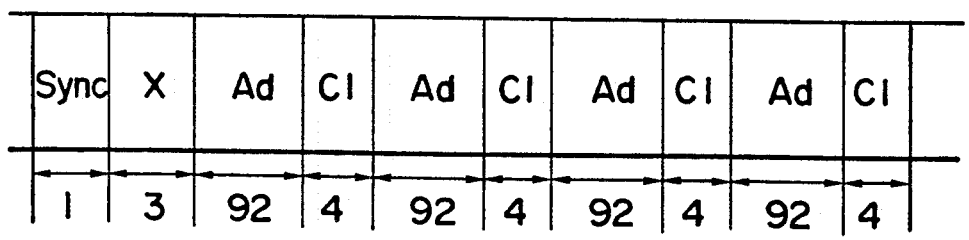
FIG. 11 is a view showing the structure of an audio synchronizing block in the recorder shown in FIG. 7.

The video signal is read by the unit of two rows from the block in FIG. 8, in a manner as shown in FIG. 10, and the audio signal is read by the unit of four rows from the block in a manner as shown in FIG. 11.

A switch 109 receives a signal, of a duration required for forming a track, from a track change timing generator 110, and the data of 384 bytes are read (32×3) times the memory 103 and 3 times from the memory 107 during said duration.

A circuit 110 adds synchronizing data of one byte (Sync) and data (X) of 3 bytes containing a synchronizing block number and a redundancy code for said number to the above-mentioned data every 384 bytes, whereby a synchronizing block of 392 bytes is obtained. FIG. 10 shows a video synchronizing block containing video data Vd, and FIG. 11 shows an audio synchronizing block containing audio data Ad. In this manner there are obtained recording data consisting of three audio synchronizing blocks and 96 video synchronizing blocks per one track.

A synchronizing block replacing circuit 111 dispersing said audio synchronizing blocks within the above-mentioned video synchronizing blocks. The three audio synchronizing blocks consecutively entered are dispersed among 96 video synchronizing blocks, as shown in FIG. 12A, in which shown are synchronizing blocks, A-1, A-2, A-3, V-1-1, V-1-2, ..., V-32-2 and V-32-3. The synchronizing blocks are released from said circuit 111 in the order of A-1, V-1-2, V-1-3, V-1-1, V-12-1, A-2, V-13-3, V-13-1, ..., V-23-2, A-3, V-24-1, ..., V-32-2 and V-32-3. The structure of the replacement circuit 111 will be explained later.

Figure 13:
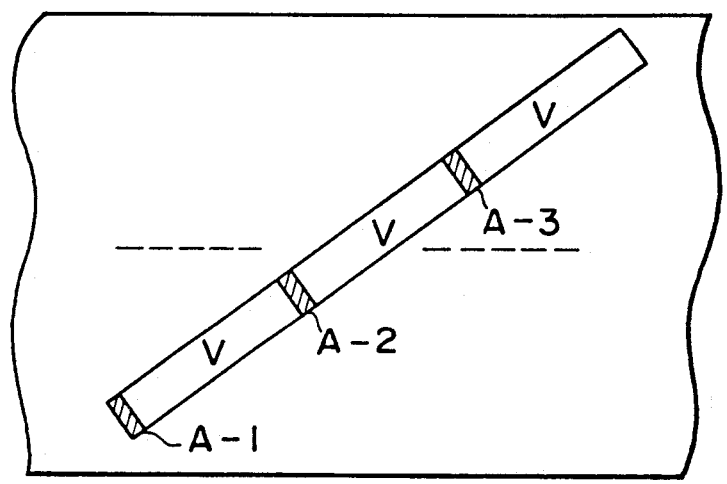
FIGS. 13 and 14 are views showing recording patterns on a recording medium in the recorder shown in FIG. 7.

The data released from the circuit 111 are supplied, through a digital modulator 112, to a recording/reproducing unit 113 and recorded on a magnetic tape. FIG. 13 shows the positions of the audio synchronizing blocks and the video synchronizing blocks on a track of the magnetic tape. As shown in FIG. 13, the audio synchronizing blocks A-1, A-2, A-3 are in equally divided positions in the track.

Now reference is made to FIGS. 12A and 12B for explaining another function of said block replacement circuit 111, wherein shown are synchronizing blocks A-1, A-2, A-3, A-1', A-2', A-3', V-1-1, V-1-2, ..., V-32-2, V-32-3. FIG. 12A shows the order of recording of synchronizing blocks on an odd track, while FIG. 12B shows that in an even track. In an odd track, the circuit 111 releases the synchronizing blocks in the order of A-1, V-1-2, V-1-3, V-1-1, ..., V-12-1, A-2, V-13-3, V-13-1, ..., V-23-2, A-3, V-24-1, ..., V-32-2, V-32-3. In an even track, the blocks are released in the order of V-1-1, V-1-2, V-1-3, ..., A-1', V-6-2, V-6-3, ..., V-16-1, A-2', V-17-3, ..., V-27-1, V-27-2, A-3', ..., V-32-1, V-32-2, V-32-3.

Figure 14:
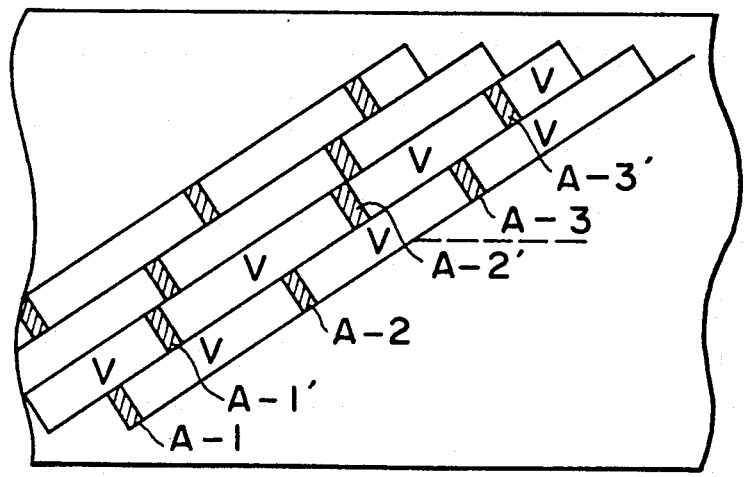

FIG. 14 shows the arrangement of the audio synchronizing blocks and the video synchronizing blocks in tracks on the magnetic tape. Thus the audio synchronizing blocks A-1, A-2, A-3 on an odd track are at positions of equally dividing the track into three. On the other hand, the audio synchronizing blocks A-1', A-2', A-3' are at positions of 1/6, 3/6 and 5/6 of an even track.

Figure 15:
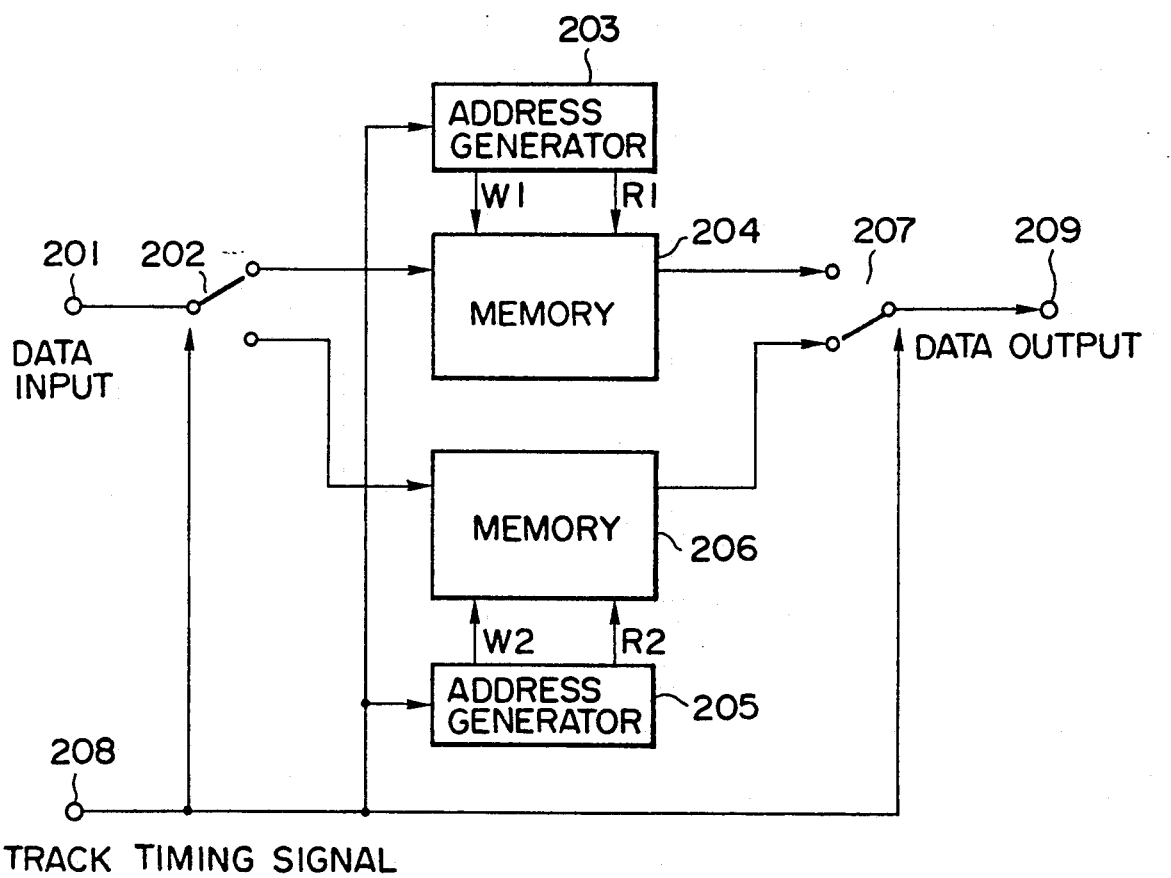
FIG. 15 is a block diagram showing an example of the synchronizing block replacing circuit shown in FIG. 7.

FIG. 15 shows an example of the synchronizing block replacement circuit 111.

A terminal 201 receives data consecutively containing audio synchronizing blocks. Said input signal is recorded, by the unit of one track, in memory 204 or 206 by means of a switch 202.

The switch 202 is controlled by the timing signal shown in FIG. 7 received through a timing signal input terminal 208, thus selecting the memory 204 or 206 at every track. The writing of data into the memories 204, 206 is controlled by signals W1, W2 generated by address generators 203, 205 similarly controlled by the track timing signal, whereby the audio data are dispersed among the video data. In data reading, the address is designated by signals R1, R2 from said address generators 203, 205.

The data in the memories 204, 206 are both read in the order shown in FIG. 12A in the first-mentioned example, but, in the second-mentioned example, the data of the memory 204 are read in the order shown in FIG. 12A while those of the memory 206 are read in the order shown in FIG. 12B.

In the following there will be explained the reproducing function with reference to FIG. 7.

The signal reproduced from the recording/reproducing unit is modulated in a digital demodulator 121, and is supplied to synchronization detector 122, a data detector 124, and a block number detector 123. The synchronization detector 122 detects the synchronizing data, and clock signals generated in response to said synchronizing data are used in the data detector 124 for reproducing the data and in said block number detector 123 for detecting the block number in said data X.

A synchronizing block replacement circuit 125 effects a process inverse to that conducted in the circuit 111, thus releasing 3 audio synchronizing blocks and 96 video synchronizing blocks in consecutive manner. This process utilizes the timing signal from the aforementioned circuit 110, and is confirmed by the synchronizing block numbers. A switch 126 supplies a memory 127 with the video data and a memory 128 with the audio data. These data are subjected to error correction by ECC decoding circuits 129, 130, and are converted into original analog signals by D/A converters 131, 132, and finally released from terminals 133, 134.

In the video tape recorder explained above, two audio synchronizing blocks out of three can be reproduced with an extremely high probability, and, the error correction can be achieved with a considerably high probability if the audio data and the error correction data are suitably replaced in the memory 107. Also, even if the error correction is not complete, interpolation is easy because two data blocks out of three can be securely reproduced. Thus the deterioration of the reproduced audio signal can be minimized even in case of a prolonged dropout.

Besides, if the synchronizing block replacement circuit 125 performs the latter-mentioned function, the audio data will become dispersed not only along the track but also in the longitudinal direction of the tape. Consequently a scar on the tape which is frequently encountered along the track or along the longitudinal direction of the tape will not damage two consecutive audio blocks which are manually close in time, so that satisfactory reproduction is possible. Besides, video blocks are also dispersed with respect to the audio blocks, so that satisfactory interpolation will become possible.

In the foregoing embodiment the same recording pattern is employed in every other track, but it is also possible to repeat the same recording pattern in every n (>2) tracks by employing n address generators in FIG. 8.

Though the foregoing embodiment is limited to a digital video tape recorder, a similar effect can be obtained in a video tape recorder for recording an analog video signal and a time-compressed digital audio signal in a time-division multiplex system, by employing different recording positions for the audio data in different tracks.

What is claimed is:

1. A digital signal recording apparatus, comprising:
   (a) first means for forming digital video data;
   (b) second means for forming digital audio data;
   (c) third means for forming (a) video synchronizing blocks each of which comprises a predetermined number of digital video data and synchronizing data, and (b) audio synchronizing blocks each of which comprises a predetermined number of digital audio data and synchronizing data; and
   (d) recording means for recording said video synchronizing blocks and said audio synchronizing blocks in tracks formed on a recording medium, said tracks being aligned in a direction of travel of said recording medium, said recording means including time-division multiplexing means for time-division multiplexing a predetermined number of said video synchronizing blocks and a predetermined number of said audio synchronizing blocks to produce a data sequence for each of said tracks, said time-division multiplexing means producing different data sequences for neighboring tracks.

2. An apparatus according to claim 1, wherein the number of data of each of said video synchronizing blocks is the same as the number of data of each of said audio synchronizing blocks.

3. An apparatus according to claim 2, wherein said recording means produces data sequences in which audio synchronizing blocks are not adjacent each other within any data sequence.

4. An apparatus according to claim 1, wherein said time-division multiplexing means produces data sequences in which audio synchronizing blocks are not adjacent each other from one data sequence to the next.

* * * * *

UNITED STATES PATENT AND TRADEMARK OFFICE
CERTIFICATE OF CORRECTION

PATENT NO. : 5,012,352

DATED : April 30, 1991

INVENTOR(S) : Yoshimura, et al.

It is certified that error appears in the above-identified patent and that said Letters Patent is hereby corrected as shown below:

COLUMN 1

Line 10, "signal" should read --signals--;
    Line 25, "signal" should read --signals--;
    Line 51, "equal" (first occurrence) should be deleted;
    Line 58, "signal" should read --signals--; and
    Line 59, "signal" should read --signals--.

COLUMN 2

Line 51, "($f_{sc}$subcarrier" should read --($f_{sc}$:subcarrier--; and
    Line 58, "digized" should read --digitized--.

COLUMN 3

Line 65, "audio" should read --an audio--.

COLUMN 5

Line 3, "(horizontal); (= 93/3)" should read --(horizontal; 93/3)--;
    Line 6, "block" should read --block of--;
    Line 10, "signal" should read --signals--;
    Line 49, "dispers-" should read --disperses--;
    Line 50, "ing" should be deleted; and
    Line 56, "V-1-1," should read --V-1-1-, ...,--.

UNITED STATES PATENT AND TRADEMARK OFFICE
CERTIFICATE OF CORRECTION

PATENT NO. : 5,012,352

DATED : April 30, 1991

INVENTOR(S) : Yoshimura, et al.

It is certified that error appears in the above-identified patent and that said Letters Patent is hereby corrected as shown below:

COLUMN 6

Line 7, "in" (first occurrence) should read --on--.

Signed and Sealed this

Twenty-ninth Day of December, 1992

*Attest:*

DOUGLAS B. COMER

*Attesting Officer*     *Acting Commissioner of Patents and Trademarks*